(12) United States Patent
Dine

(10) Patent No.: US 6,817,950 B2
(45) Date of Patent: Nov. 16, 2004

(54) HIGH ANGLE CONSTANT VELOCITY JOINT

(75) Inventor: Donald W. Dine, Rochester Hills, MI (US)

(73) Assignee: GKN Driveline North America, Inc., Auburn Hills, MI (US)

(*) Notice: Subject to any disclaimer, the term of this patent is extended or adjusted under 35 U.S.C. 154(b) by 0 days.

(21) Appl. No.: 10/294,197

(22) Filed: Nov. 14, 2002

(65) Prior Publication Data

US 2004/0097292 A1 May 20, 2004

(51) Int. Cl.$^7$ .................................... F16D 3/224
(52) U.S. Cl. ............................. 464/145; 464/906
(58) Field of Search ......................... 464/145, 146, 464/906, 175

(56) References Cited

U.S. PATENT DOCUMENTS

| | | | | |
|---|---|---|---|---|
| 4,589,857 | A | * 5/1986 | Okoshi | 464/145 |
| 5,122,096 | A | * 6/1992 | Aucktor et al. | 464/145 |
| 5,643,091 | A | * 7/1997 | Kozlowski | 464/144 |
| 5,647,801 | A | * 7/1997 | Jacob | 464/145 |
| 5,899,814 | A | * 5/1999 | Murillo | 464/140 |
| 6,120,382 | A | * 9/2000 | Sone et al. | 464/145 |
| 6,267,683 | B1 | * 7/2001 | Jacob | 464/145 |
| 6,299,542 | B1 | 10/2001 | Ouchi et al. | |
| 6,383,082 | B1 | * 5/2002 | Declas | 464/145 |
| 6,402,623 | B2 | 6/2002 | Ouchi et al. | |
| 6,478,683 | B1 | 11/2002 | Ouchi et al. | |
| 6,478,684 | B2 | 11/2002 | Ouchi et al. | |
| 2003/0017877 | A1 | 1/2003 | Kobayashi et al. | |

* cited by examiner

Primary Examiner—David Bagnell
Assistant Examiner—K. Thompson
(74) Attorney, Agent, or Firm—Jennifer M. Brumbaugh; Mick A. Nylander

(57) ABSTRACT

A high angle constant velocity joint for use in a vehicle. The high angle constant velocity joint includes an outer race having a bore therethrough. The outer race also includes a plurality of tracks on an inside surface of the outer race. The constant velocity joint includes a cage arranged within the bore of the outer race without contacting the outer race. The constant velocity joint also includes an inner race arranged within the cage, the inner race having a plurality of tracks on an outer surface with one half of the tracks open in a direction opposite of another one half of the tracks on the inner race. The constant velocity joint also includes a plurality of large diameter balls arranged within the cage and tracks of the inner and outer race. The constant velocity joint has a shaft connected to the inner race and a pliable boot arranged between the outer race and the shaft. The constant velocity joint also includes a cap contacting the outer race. The high-speed, high angle constant velocity joint will allow for a more efficient and smaller package constant velocity joint for use in high angles and high speeds thus increasing the reliability of the boot and overall reliability of the constant velocity joint.

7 Claims, 10 Drawing Sheets

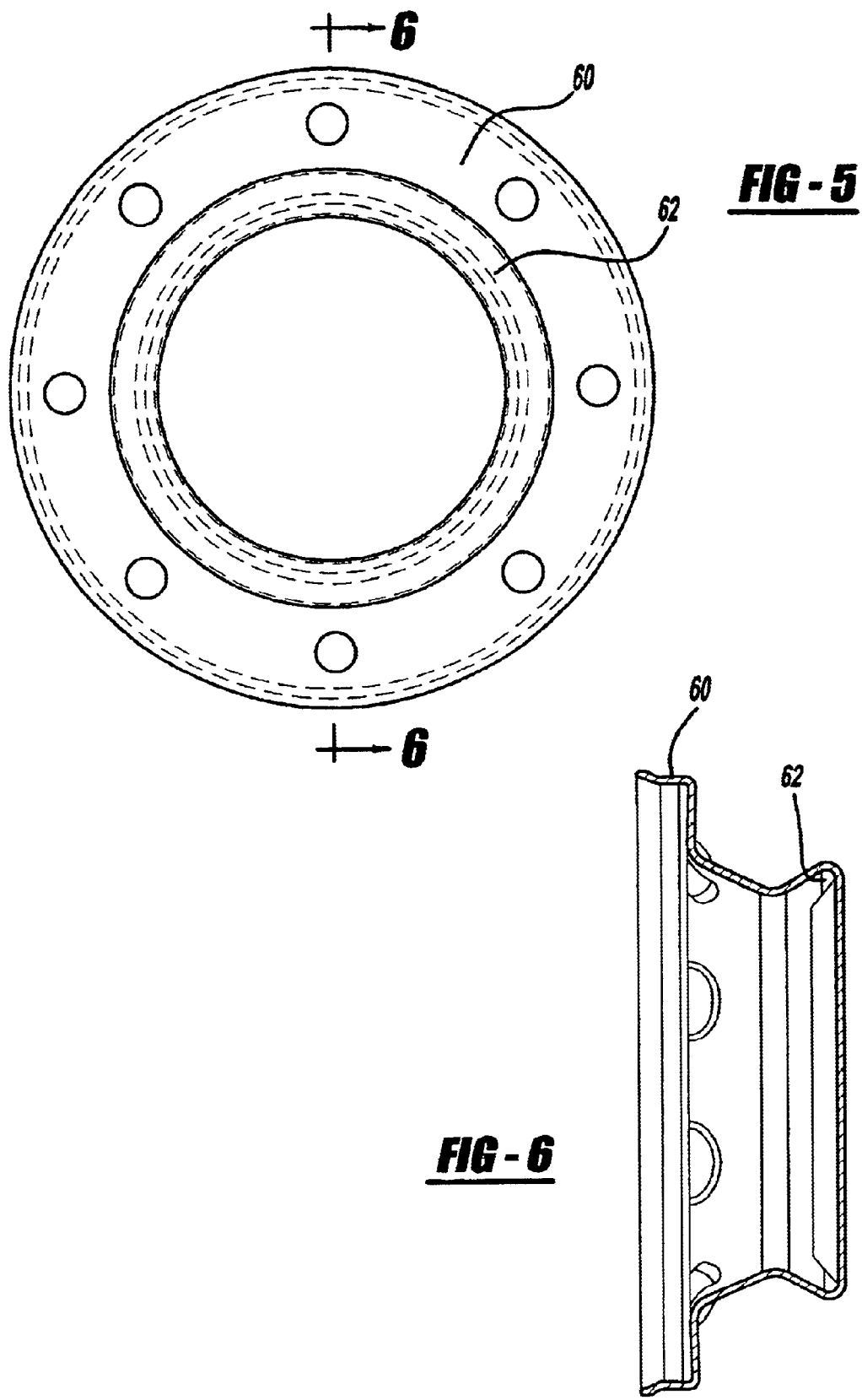

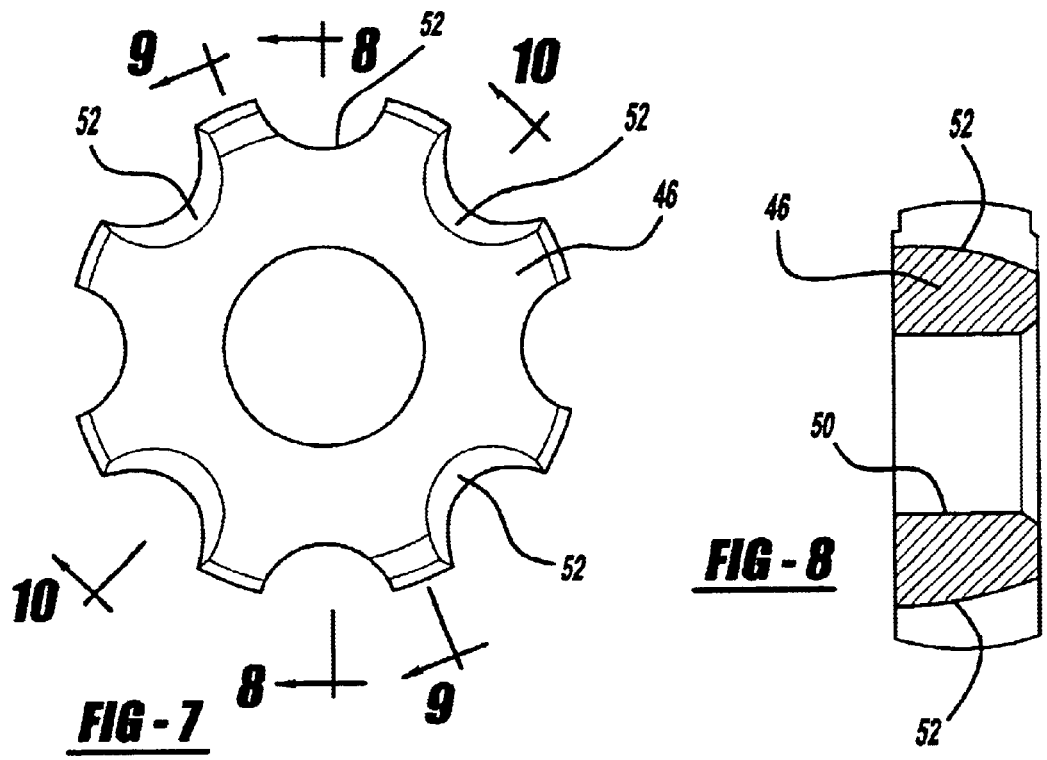
FIG - 7
FIG - 8
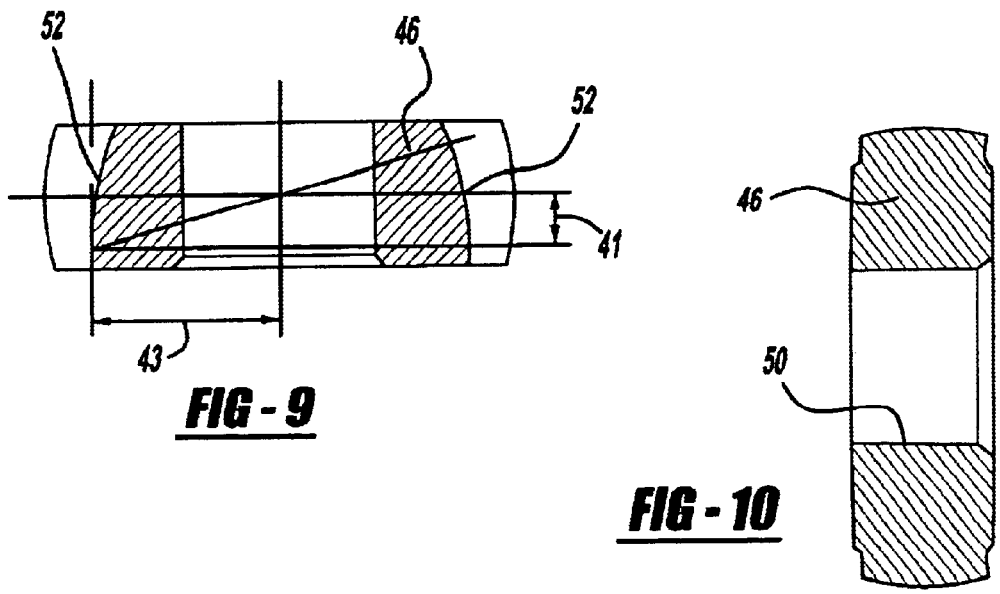
FIG - 9
FIG - 10

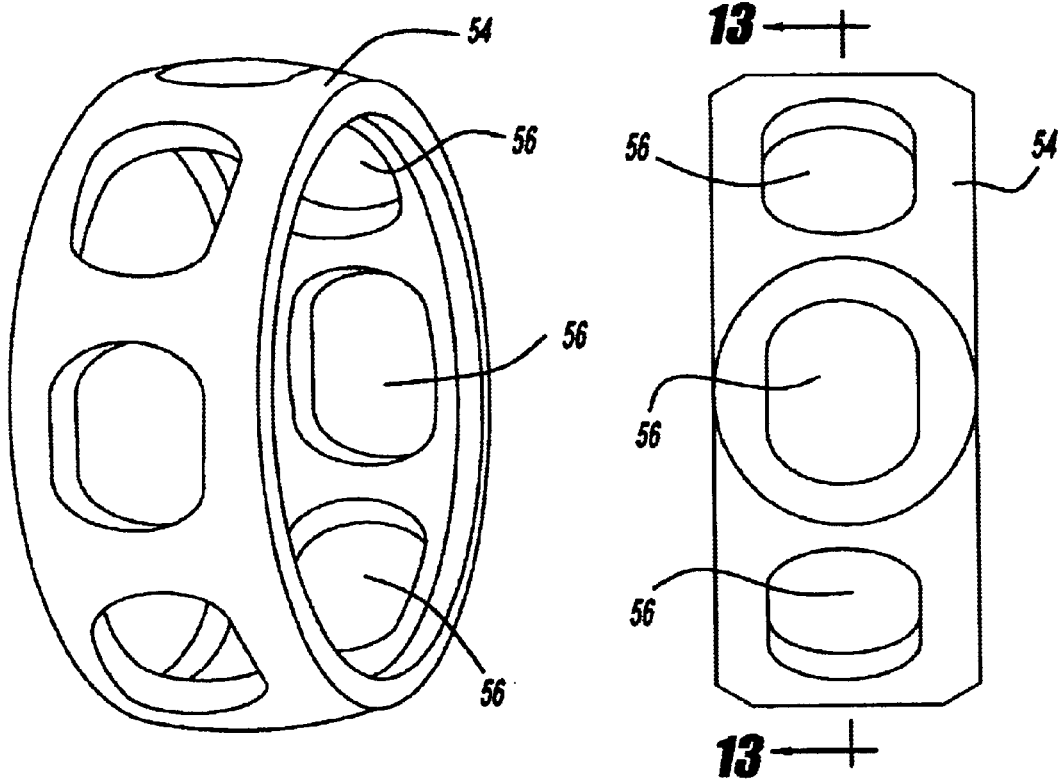
FIG - 11
FIG - 12
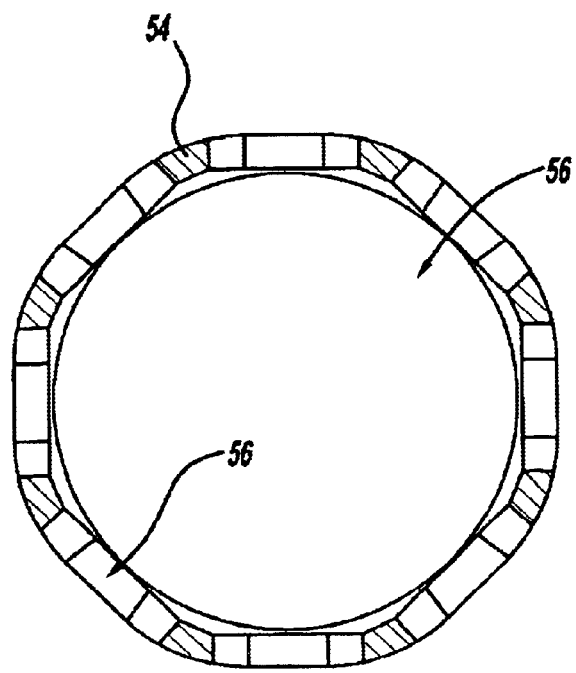
FIG - 13

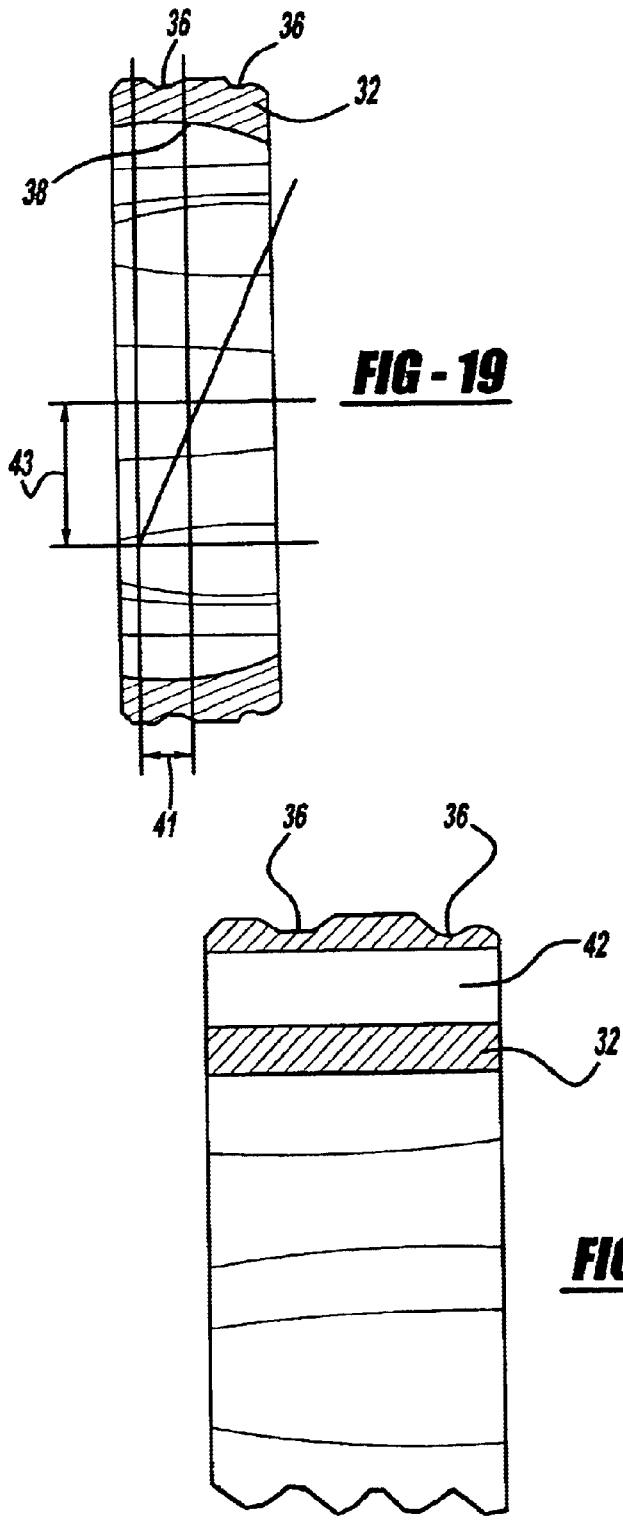

HIGH ANGLE CONSTANT VELOCITY JOINT

BACKGROUND OF THE INVENTION

1. Field of the Invention

The present invention generally relates to constant velocity joints and more particularly, relates to a high angle, high-speed constant velocity joint.

2. Description of the Related Art

Constant velocity joints (CV joints) are common components in automotive vehicles. Typically, constant velocity joints are employed where transmission of a constant velocity rotary motion is desired or required. Common types of constant velocity joints are a plunging tripod, a fixed tripod, a plunging ball joint, and a fixed ball joint. These joints can be used in front wheel drive vehicles, or rear wheel drive vehicles and on the propeller shafts found in rear wheel drive, all wheel drive and four wheel drive vehicles. The plunging constant velocity joints allow for axial movement during the operation without the use of slip splines, but sometimes initiate forces that result in vibration and noises. The plunging types allow angular displacement along with the axial displacement along two axes thereof. The fixed type constant velocity joints generally only allow angular displacement between two axes. The fixed constant velocity joints are better situated for higher operating angles than that of a plunging type constant velocity joint. All of these constant velocity joints are generally grease lubricated for life and sealed by a sealing boot when used on drive shafts. Thus, the constant velocity joints are sealed in order to retain grease inside the joint while keeping contaminates and foreign matter, such as dirt and water, out of the joint. The sealing protection of the constant velocity joint is necessary because contamination of the inner chamber causes internal damage and destruction of the joint which increases heat and wear on the boot, thus inevitably leading to premature boot and grease failures and hence failure of the overall joint. The problem of higher temperatures in high speed fixed constant velocity joint is greatly enhanced at the higher angles. Thus, the increased temperatures because of higher angles along with increased stresses on the boot because of higher angles may result in premature failures of the prior art constant velocity joints.

Generally, prior art fixed type constant velocity joints included a bulky and heavy outer race having a spherical inner surface and a plurality of grooves on a surface therein. The joints also include an inner race, having a spherical outer surface with guide grooves formed therein. Most of the prior art fixed type constant velocity joints used six torque transmitting balls, which are arranged between the guide grooves and the outer and inner race surfaces of the constant velocity joint by a cage retainer. The balls allow a predetermined displacement angle to occur through the joint thus transmitting a constant velocity through the shafts of the automotive drive train system.

Therefore, there is a need in the art for a constant velocity joint that is capable of high angle and high-speed use. There is also a need in the art for a constant velocity joint that has a smaller package, increased efficiency and better thermal characteristics during high-speed, high angle operation.

SUMMARY OF THE INVENTION

One object of the present invention is to provide an improved constant velocity joint.

Another object of the present invention is to provide a high angle, high-speed opposing track constant velocity joint.

Yet a further object of the present invention is to provide a constant velocity joint that centers the cage and supports the cage by an inner race spherical surface alone.

Still a further object of the present invention is to provide a constant velocity joint that uses axially opposed tracks.

Yet a further object of the present invention is to provide a constant velocity joint that uses double offset tracks.

Still another object of the present invention is to provide a constant velocity joint that is configured such that the boot will be able to set within the cage and move closer to the center line of the joint.

Still a further object of the present invention is to provide a constant velocity joint that is balanced such that the shaft and tube will be capable of moving through the outer race in the event of a collision.

Still another object of the present invention is to provide a constant velocity joint that is capable of assembly without the use of cage grooves.

To achieve the foregoing objects, a constant velocity joint for use in a vehicle includes an outer race and cage arranged within the outer race. The constant velocity joint also includes an inner race having an outer surface wherein that outer surface alone centers and supports the cage. A plurality of balls are arranged within the cage. The constant velocity joint also includes a shaft connected to the inner race and a boot cover contacting the outer race. A boot is arranged between the boot cover and the shaft while a cap is secured to the outer race on a side opposite of the boot cover.

One advantage of the present invention is that the constant velocity joint can be used for high angle, high speed applications and may include from six to ten torque transmitting balls.

A further advantage of the present invention is that the constant velocity joint uses a cage that is centered and supported by the inner circle surface alone insuring there is no contact between the outer race and the cage thus improving joint efficiency and reducing boot and grease thermal failures.

Still another advantage of the present invention is that the constant velocity joint uses axially opposed tracks which will result in a decrease in cage forces that allows for the elimination of guide spheres and improves the efficiency and thermal characteristics of the joint.

Yet another advantage of the present invention is that the constant velocity joint uses double offset tracks, which includes both a radial offset and an axial offset in order to flatten the tracks, promote easier rolling, provide better outer ball track edge support and therefore allow the joint to articulate to a higher angle while maintaining the improved efficiency and durability while allowing the joint to articulate to a higher angle.

Still another advantage of the present invention is the use of a constant velocity joint that allows the boot to set within the outer diameter of the cage thus moving the boot closer to the center line of the joint thus decreasing the package size and reducing boot stress.

Yet another advantage of the present invention is a constant velocity joint that will allow the tube/shaft to be plunged through an outer race bore in the event of a collision.

Still another advantage of the present invention is the use of a constant velocity joint that will allow assembly of the inner race into the cage without the use of cage grooves thus increasing the strength of the overall structure of the constant velocity joint.

Other objects, features and advantages of the present invention will become apparent from the subsequent description and appended claims, taken in conjunction with the accompanying drawings.

BRIEF DESCRIPTION OF THE DRAWINGS

FIG. 5 shows a top view of a boot cover according to the present invention.

FIG. 6 shows a cross section taken along line 6—6 of FIG. 5 of a boot cover according to the present invention.

FIG. 7 shows a top view of an inner race according to the present invention.

FIG. 8 shows a cross section of the inner race taken along line 8—8 of FIG. 7 according to the present invention.

FIG. 9 shows a cross section of an inner race taken along line 9—9 of FIG. 7 according to the present invention.

FIG. 10 shows a cross section of an inner race taken along line 10—10 of FIG. 7 according to the present invention.

FIG. 11 shows a plan view of a cage according to the present invention.

FIG. 12 shows a side view of a cage according to the present invention.

FIG. 13 shows a cross section of the cage according to the present invention taken along line 13—13 of FIG. 12 according to the present invention.

FIG. 18 shows a cross section of the outer race according to the present invention taken along line 18—18 of FIG. 17.

FIG. 19 shows a cross section of an outer race according to the present invention taken along line 19—19 of FIG. 17.

FIG. 20 shows a cross section of the outer race taken along line 20—20 of FIG. 17.

DESCRIPTION OF THE PREFERRED EMBODIMENT(S)

Figure 1:
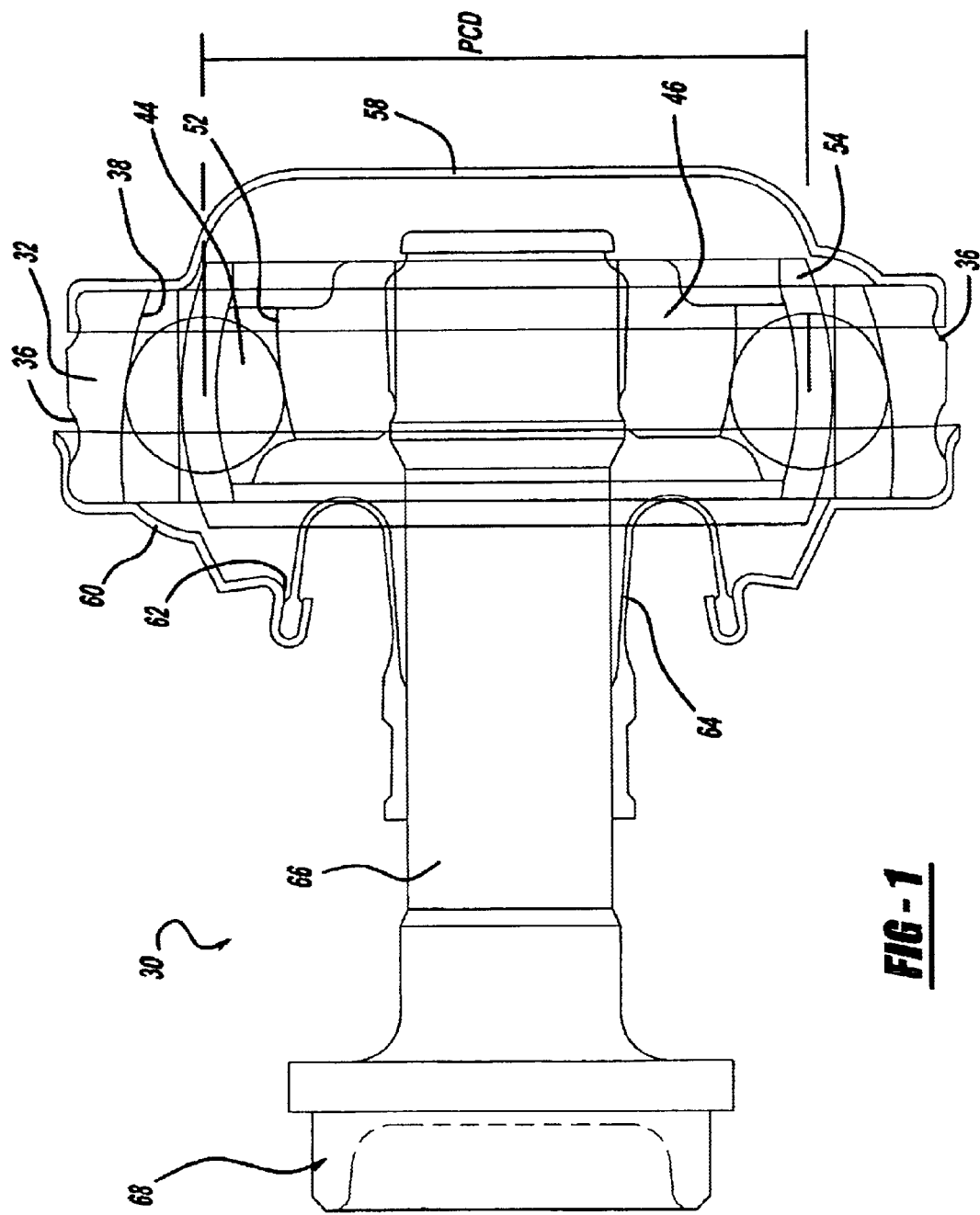
FIG. 1 shows a side view of a constant velocity joint according to the present invention.

Referring to the drawings, a constant velocity joint 30 according to the present invention is shown. It should be noted that any type of constant velocity joint, such as a plunging tripod, a fixed tripod, etc may be used according to the present invention. The constant velocity joint 30 for the present invention generally is a high angle, high speed, ball type fixed constant velocity joint for use on a propeller shafts or drive shafts. The high angle can be defined as anything greater than or equal to nine degrees. These high angle joints tend to operate at high speeds and at higher temperatures.

A typical driveline for an all wheel drive vehicle includes a plurality of constant velocity joints 30. However, it should be noted that the present invention can also be used in rear wheel drive only vehicles, front wheel drive only vehicles, all wheel drive vehicles, and four wheel drive vehicles. Generally, a driveline includes an engine that is connected to a transmission and a power takeoff unit. A front differential may have a right hand side shaft and a left hand side shaft each of which are connected to a wheel and deliver power to the wheels. On both ends of the right hand front side shaft and left hand front side shaft are constant velocity joints. A propeller shaft connects the front differential and the rear differential to the transfer case or power take off unit. The rear differential may include a right hand rear side shaft and a left hand rear side shaft each of which ends with a wheel on an end thereof. Generally, a CV joint is located on both ends of the half shaft that connect to the wheel and the rear differential. The propeller shaft generally may be a multi-piece propeller shaft that includes a plurality of Carden joints and/or high speed constant velocity joints 30. The constant velocity joints 30 transmit power to the wheels through the drive shaft even if the wheels or the shaft have changing angles due to steering, raising or lowering of the suspension of the vehicle, etc. The constant velocity joint 30 may be of any of the standard types known, such as plunging tripod, a cross groove joint, a fixed joint, or a fixed tripod joint all of which are commonly known terms in the art for different varieties of constant velocity joints. The constant velocity joints allow for transmission of constant velocities at a variety of angles which are found in everyday driving of automotive vehicles on both the half shafts and prop shafts of these vehicles.

Figure 2:
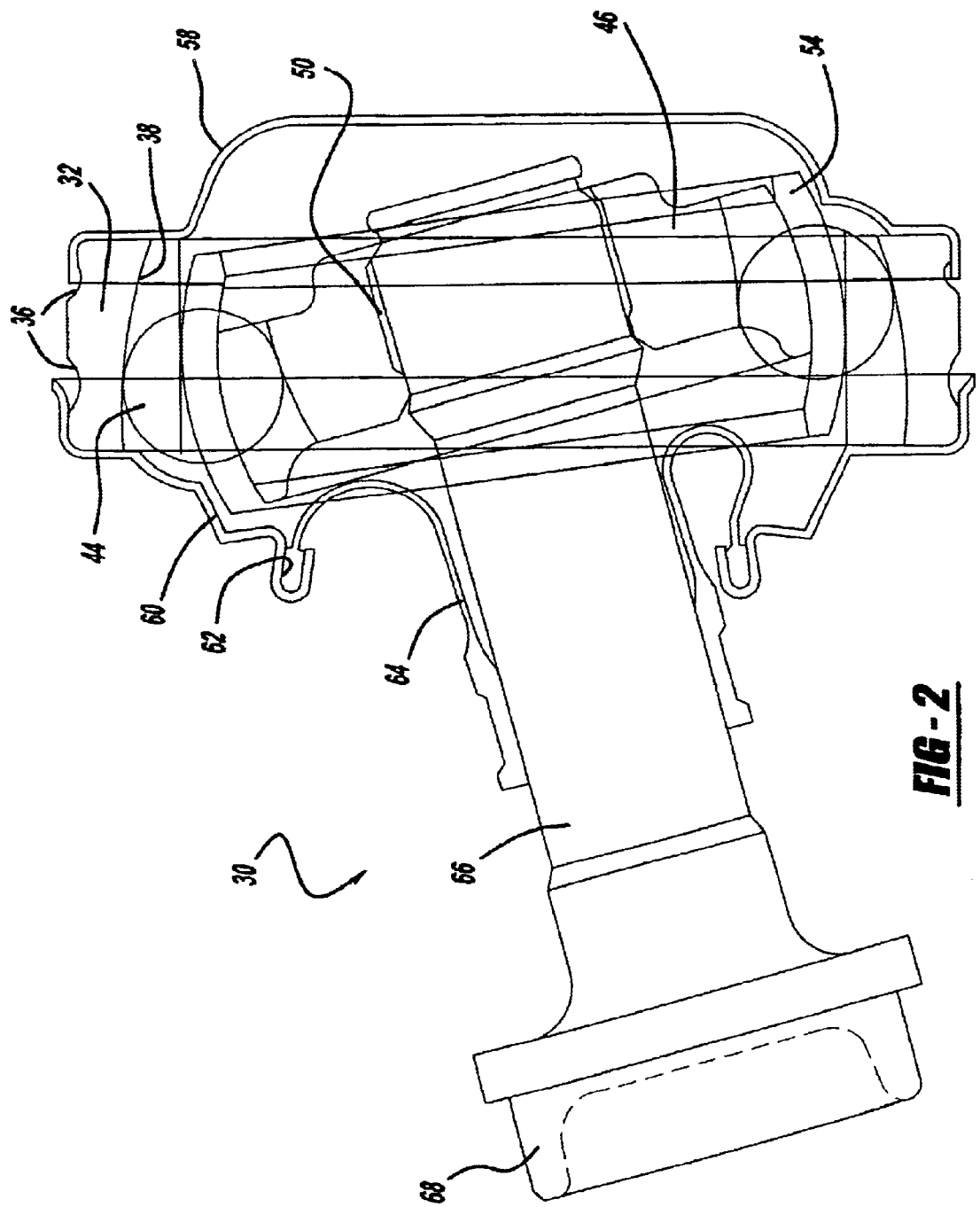
FIG. 2 shows a side view of a constant velocity joint articulated to a predetermined angle according to the present invention.
Figure 17:
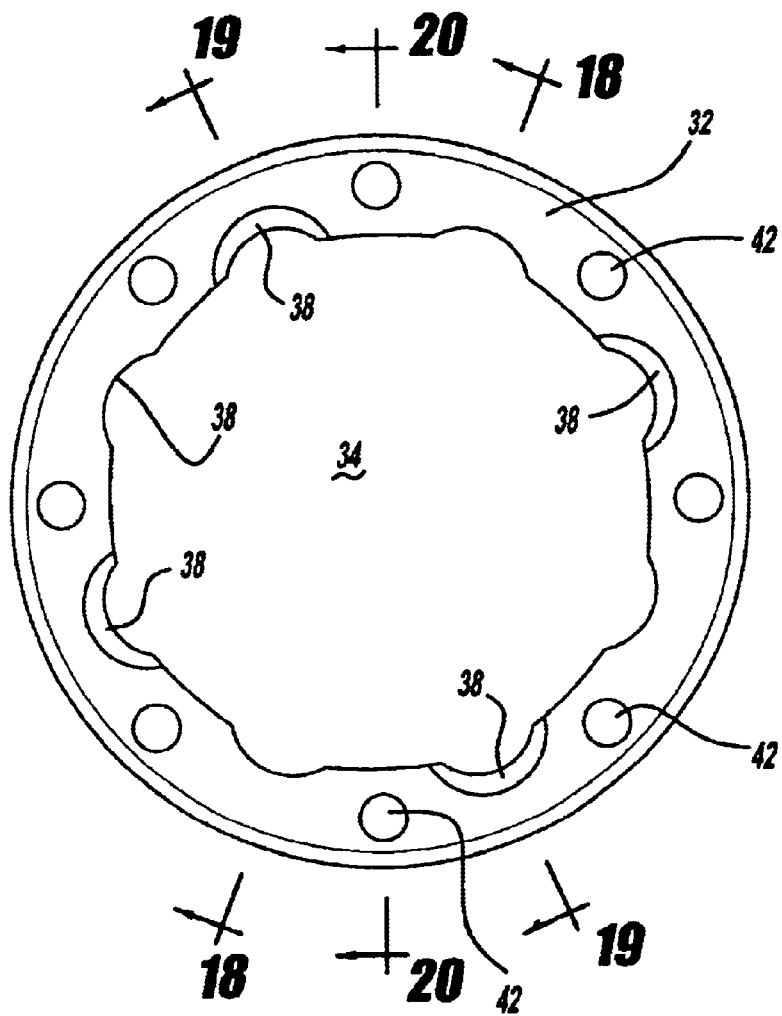
FIG. 17 shows a top view of an outer race according to the present invention.
Figure 16:
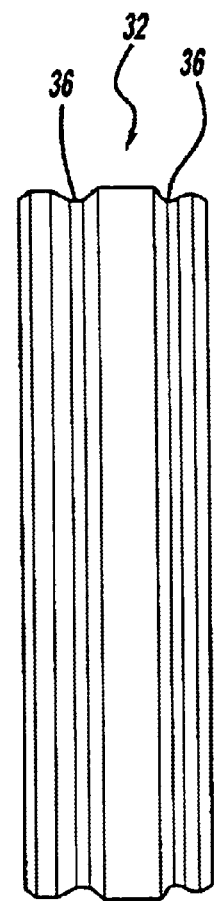
FIG. 16 shows a side view of an outer race according to the present invention.
Figure 21:
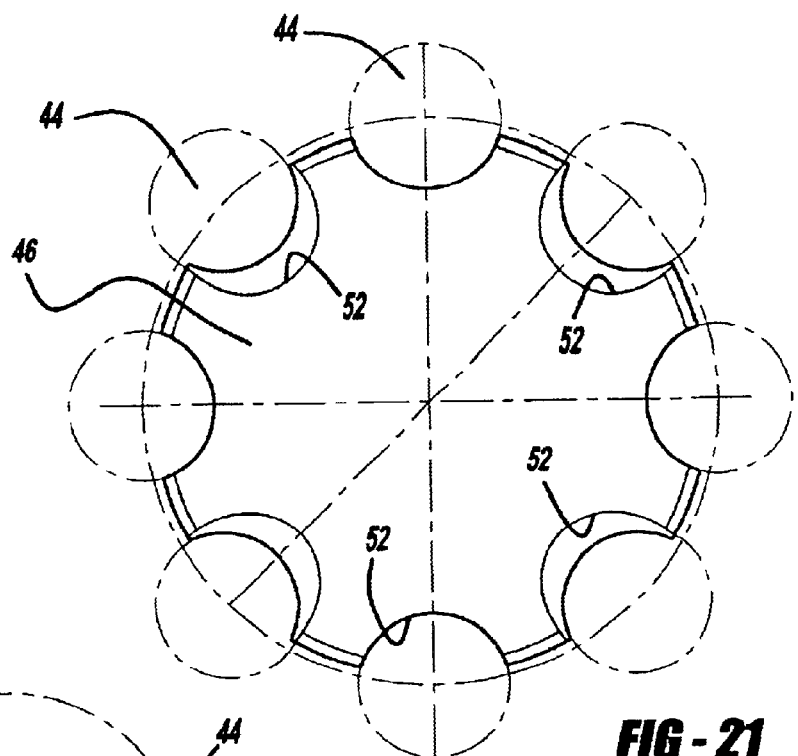
FIG. 21 shows a plan view of the inner race with a plurality of balls set therein.
Figure 22:
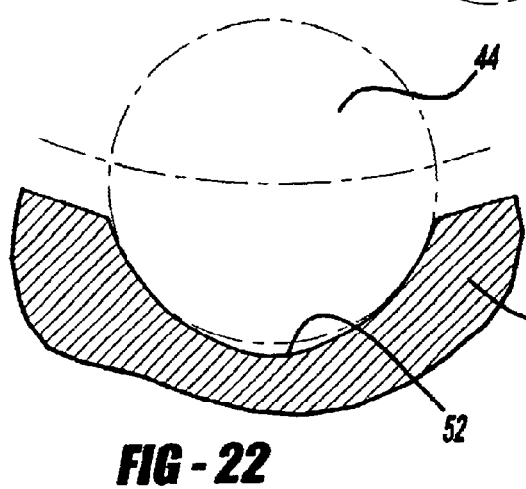
FIG. 22 shows a close up of a ball track with a ball therein according to the present invention.
Figure 23:
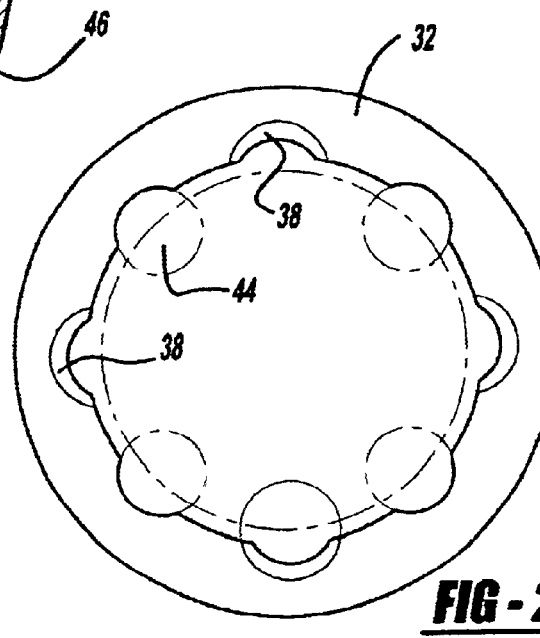
FIG. 23 shows a top view of the outer race with a plurality of balls therein.

FIGS. 1 through 23 shows one embodiment of the present invention. A high speed, high angle constant velocity joint 30 is generally shown in FIGS. 1 and 2. The constant velocity joint 30 includes an outer race 32 generally having a circumferential shaped bore 34 therethrough. The outer race 32 generally has a ring like appearance. On an outer surface of the constant velocity joint outer race 32 is located at least one circumferential channel 36 around the entire outer periphery of the outer race 32. The outer race 32 also includes a plurality of mounting orifices 42 equidistantly located around an outer periphery thereof. The outer race 32 is generally made of a steel material, however it should be noted that any other type of metal material, hard ceramic, plastic, or composite material, etc. may also be used for the outer race 32. The material is required to be able to withstand the high speeds, temperatures and contact pressures of the constant velocity joint 30. The outer race 32 also includes a plurality of axially opposed ball tracks 38 located on an inner surface thereof. The tracks 38 generally form a spherical shaped path within the inner surface of the outer race 32. The tracks 38 are axially opposed such that one half of the ball tracks 38 open to a side of the outer race 32 opposite to that of the other half of the ball tracks 38 in any number of patterns. In one embodiment, as shown in FIG. 17, every other track 38 opens towards one side of the outer race 32, while the alternating tracks 38 open towards the opposite side of the outer race 32. Therefore, the axial slope of the ball tracks 38 lay opposite to one another in the axial direction in an alternating pattern in this one embodiment. This will ensure a decrease in the cage forces and will allow the elimination of at least one of the guidance spheres and will also improve the efficiency and thermal characteristics of the constant velocity joint 30. The prior art had the ball tracks all opening or axially aligned on the same side of the outer race. In the present invention, the ball tracks 38 may also be of a gothic or elliptical shape provided the pressure angle and conformity are maintained.

It should be noted that the constant velocity joint outer race 32 is thinner than the outer races of prior art constant velocity joints. This will help reduce the weight of the outer race 32 while also reducing the package size of the constant velocity joint 32. In one embodiment the outer race 32 is approximately twenty four mm but may be any width less than one hundred fifty mm for a disc style joint but maybe much greater than that for a monoblock style joint depending on the design requirements for the automotive vehicle. The use of the axially opposed tracks allows the cage 54 to be centered while maintaining a predetermined distance from the edge surfaces of the outer race 32. This insures that the constant velocity joint 30 is symmetrical in nature.

The ball tracks 38 on the inner surface of the outer race 32 also are double offset tracks. The double offset tracks 32 incorporate both a radial offset 43 in addition to an axial offset 41. This will flatten the ball tracks 38 and promote rolling and therefore improve efficiency and durability of the constant velocity joint 30. It should be noted that the flattened tracks 38 also result in better track edge support. This permits a higher pressure angle and a closer conformity of the ball 44 to the track 38. This will allow the joint 30 to articulate to a higher angle than that of prior art joints while maintaining superior durability. The axial offset 41 and radial offset 43 have values that along with the pitch circle diameter (PCD), which is defined as the midpoint of a ball 44 on one side to the midpoint of a ball 44 on the other side through a center point of the joint 30, have predetermined ratios. The predetermined ratios of the axial offset, radial offset and the pitch circle diameter (PCD) allow for better ball rolling and increased efficiency of the constant velocity joint 30. It should be noted that in the embodiment shown in the drawings is a four plus four constant velocity joint 30 which has a total of eight balls in the constant velocity joint 30. However, it should be noted that it is contemplated to make a ten ball six ball, four ball or two ball joint incorporating all of the features of the constant velocity joint 30 according to the present invention.

The constant velocity joint 30 also includes an inner race 46 generally having a circumferential shape. The inner race is arranged within the bore 34 of the outer race 32. The inner race 46 includes an inner bore 48 that has a plurality of splines 50 on the inner surface thereof. The outer surface of the inner race 46 includes a plurality of ball tracks 52 that are axially opposed. The ball tracks 52 generally have a spherical shape and are aligned with the ball tracks 38 on the outer race 32 such that the axial angle will open in a similar or the same direction as the ball track 38 directly aligned above it on the outer race 32. The ball tracks 52 on the outer spherical surface of the inner race 46 have one half of the ball tracks 52 axially oriented in one way while the other half of the ball tracks 52 are axially oriented in the opposite direction. In the embodiment shown, the ball tracks 52 will open in an alternating pattern around the outer circumference of the inner race 46. The ball tracks 52 with the spherical or elliptical shape on the inner race 46 also include a double offset that includes both a radial offset and an axial offset to promote a flattening of the spherical tracks 52 thus leading to improve efficiency and durability of the constant velocity joint 30 as discussed above for the outer race 32. It should be noted that in one embodiment the inner race 46 is made of steel, however any other, metal composite, hard plastic, ceramic, etc. may also be used.

The constant velocity joint 30 includes a roller cage 54 generally having a ring like appearance. The roller cage 54 is arranged within the bore 34 of the outer race 32 such that it is not in contact with the inner surface of the outer race 32. The cage 54 has a plurality of oblong shaped orifices 56 through a surface thereof. The number of orifices 56 will match the number of ball tracks 38, 52 on the outer race 32 and inner race 46 of the constant velocity joint 30. In one embodiment such as that shown in the drawings there will be eight orifices 56 therethrough. The cage 54 is centered and supported solely by the outer spherical surface of the inner race 46. This will allow for an approximate 20% efficiency improvement of the constant velocity joint 30. With no contact between the outer race 32 inner surface and the outer surface of the cage 54, efficiency is improved at an approximate rate as noted above, thereby reducing the likelihood of boot and grease thermal failures. The cage 54 is also designed such that it does not have cage grooves that would weaken the cage 54. This allows the inner race 46 to be assembled within the cage 54 without the use of the specialized cage grooves. The cage 54 along with the inner race 46 are preferably made of a steel material but any other hard metal material, plastic, composite or ceramic, etc. may also be used. The cage 54 in the present invention is nearly in equilibrium and therefore most of the contact loads cancel each other out. This will also help increase the efficiency of the constant velocity joint 30.

The constant velocity joint 30 includes a plurality of balls 44. The balls 44 generally have a larger diameter which is permitted since the assembly angle is smaller for the constant velocity joint 30, than for most of the current art. The use of the larger diameter balls 44 also reduces the stress on the inner race 46. The larger diameter balls 44 are each arranged within one each of the orifices 56 of the cage 54 and within a ball track 38, 52 of the outer race 32 and of the inner race 46. Therefore, the balls 44 will be capable of rolling in the axially opposed tracks 38, 52 aligned in the same direction. The use of the double offset means that the radial path of the balls travel is shallower thus allowing for a higher angle in a smaller, lighter constant velocity joint 30.

Figure 3:
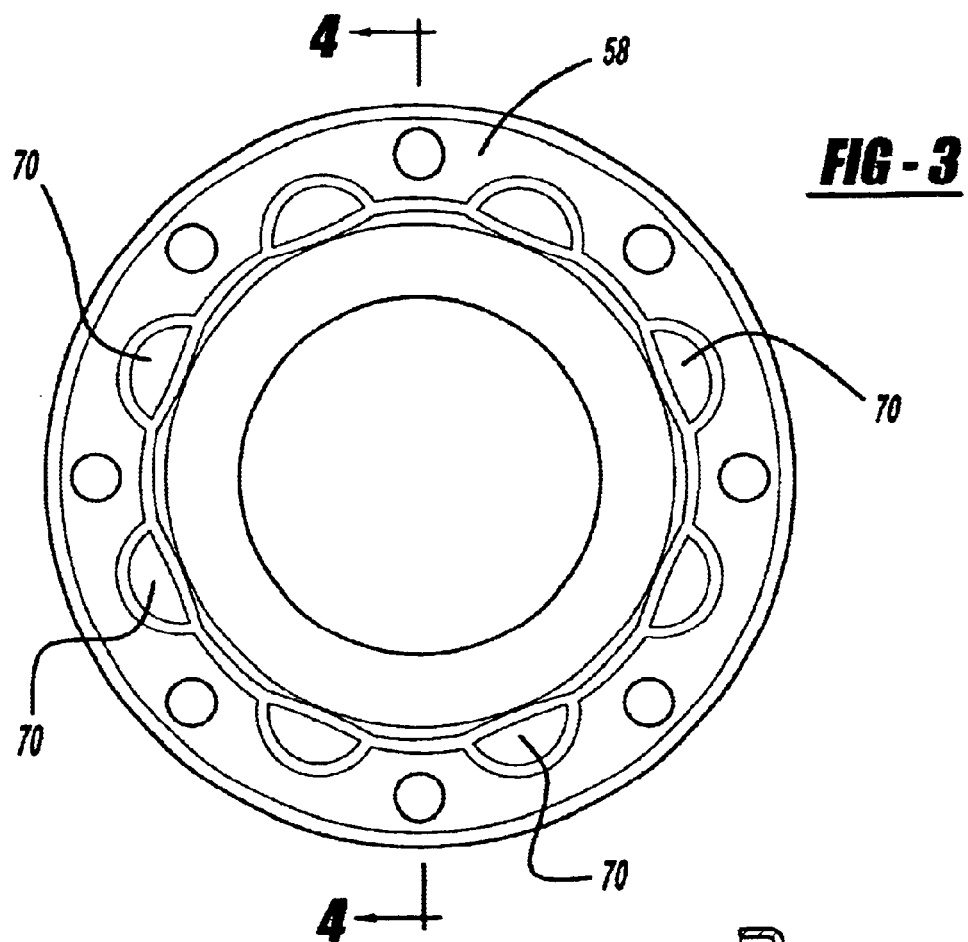
FIG. 3 shows a top view of a cover according to the present invention.
Figure 4:
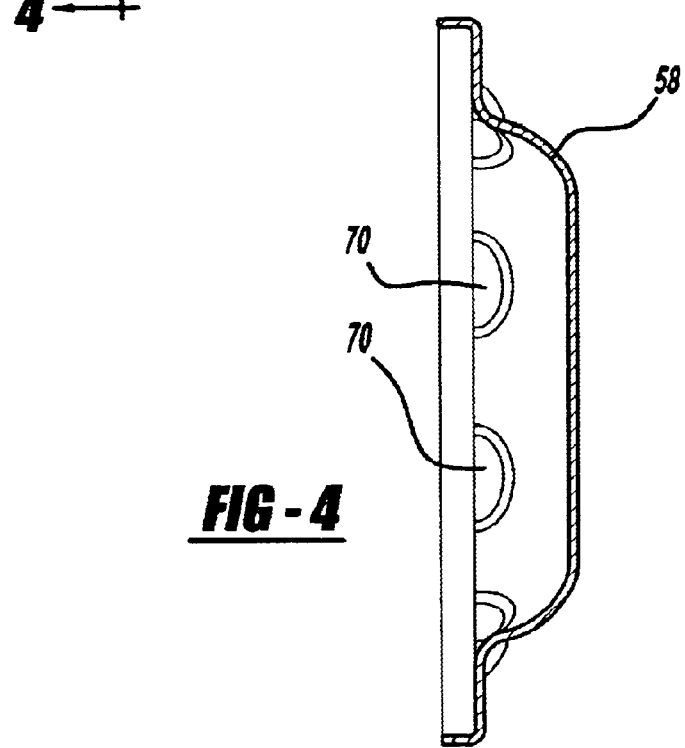
FIG. 4 shows a cross section taken along line 4—4 of FIG. 3 of a cover according to the present invention.
Figure 14:
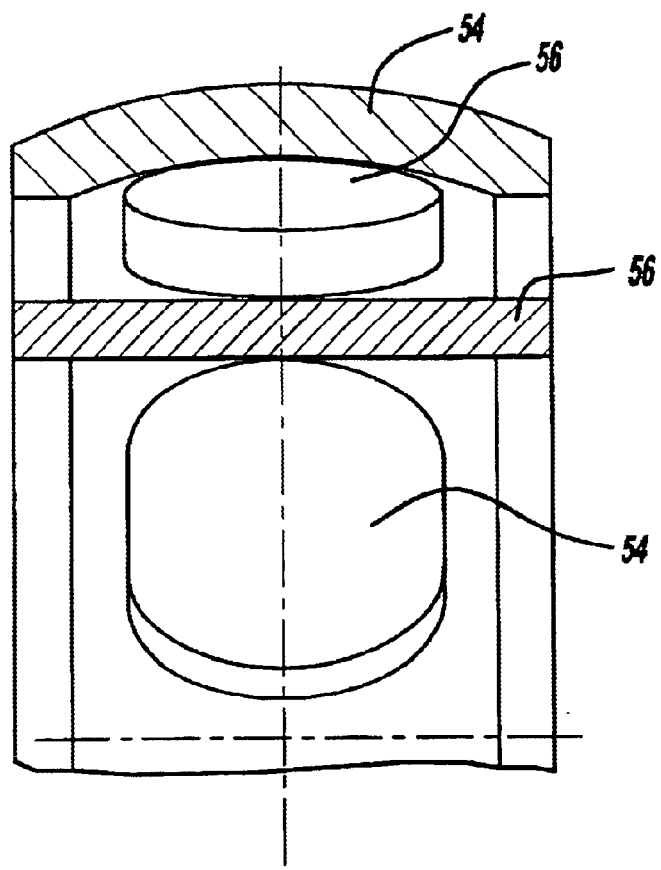
FIG. 14 shows a portion of a cage in partial cross section according to the present invention.
Figure 15:
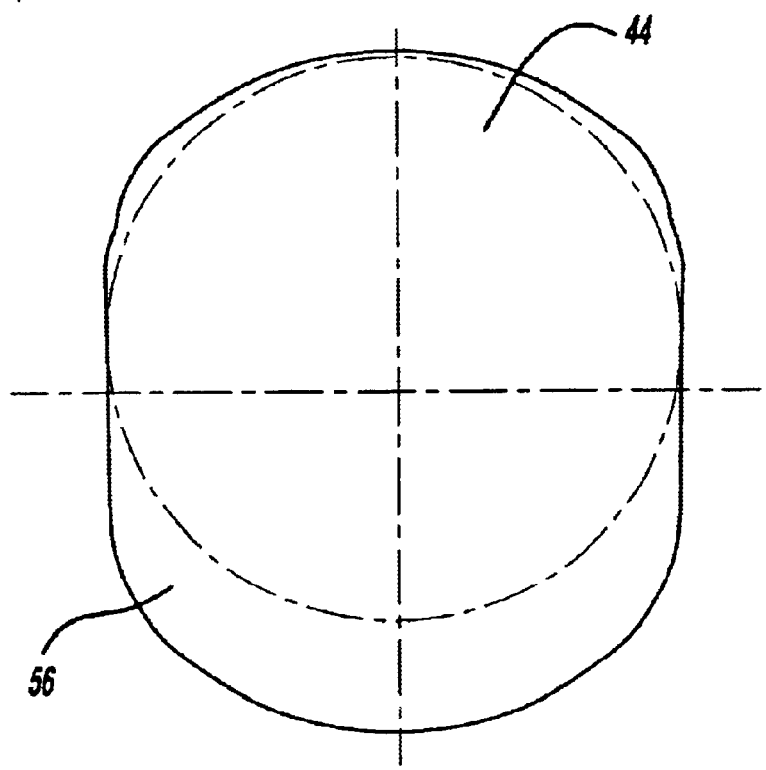
FIG. 15 shows a close up of an orifice through a cage according to the present invention.

The constant velocity joint 30 uses a grease cap 58 on one end. The grease cap 58 generally has a cup shaped appearance. The grease cap 58 is generally made of a metal material however any, plastic, rubber, ceramic or composite material may also be used. The cap 58 is press fit or connected to the outer surface of the outer race 32 via one of the circumferential channels 36 on the outer surface. However, any other securing method known may also be used such as fasteners, bonding, etc. The grease cap 58 will insure the grease, which is used as a lubricant, will remain within the constant velocity joint 30. A vent may be placed through the cap 58 to relieve any internal pressure. As shown in FIGS. 3 and 4 the cap also includes a plurality of grooves 70 to allow for rotation of the balls 44 within the constant velocity joint 30 at the high angles.

On an end opposite of the grease cap 58 of the outer race 32 is located a boot cover 60 which generally has a circumferential shape. The boot cover 60 is connected to an outer surface of the outer race 32 either via a circumferential channel 36 on an outer surface thereof or by any other known securing means. The boot cover 60 includes a circumferential channel 62 at an end opposite of the end connected to the outer race 32 for securing a pliable boot 64 therein. The boot cover 60 is generally made of a metal material however any plastic, rubber, ceramic, composite, etc. may be used.

A pliable boot 64 is secured between the boot cover 60 and the shaft 66 of the constant velocity joint 30. Any known securing method can be used to hold the boot 64 around the shaft 66 such as a boot clamp, fastener, etc. The pliable boot 64 is generally made of a urethane material but any other pliable material such as fabric, plastic, or rubber may also be used for the constant velocity joint boot 64 as long as it is capable of withstanding the high temperature and high rotational speeds of the constant velocity joint 30. It should be noted that the boot 64 is arranged such that the boot 64 is set within the outer circumference of the cage 40. This will allow the boot 64 to move closer to the center line of the constant velocity joint 30 thus decreasing the package size and reducing the stress on the boot 64 and hence reducing the likelihood of boot failure and constant velocity joint failure. FIG. 1 shows the constant velocity joint 30 at an equilibrium position and shows the boot 64 within the outer diameter of the cage 40. FIG. 2 shows the boot 64 when the constant velocity joint 30 is at a high angle, i.e., approximately 15 degrees. The boot 64 is still within the outer diameter of the cage 40 while also being closer to the center line of the joint 30, thus reducing any boot stress.

A stub shaft 66 is fixed, via the splines 50, to the inner race 46 of the constant velocity joint 30. The stub shaft 66 generally is solid and is usually welded to a tube 68 on one end thereof. The stub shaft 66 and propshaft tube will pass through the inner bore 34 of the outer race 32 during the event of a collision thus reducing the forces in the collision and absorbing energy as it collapses. It should be noted that the pitch circle diameter and the size of the balls 44 are predetermined in such a way to allow a balance to occur such that the inner race 46 and balls 44 will be allowed to plunge from the outer race 32 during a crash incident, thus allowing the shaft and tube like members to collapse therein.

The axially opposed ball tracks 32 and 52 aligned on the outer race and inner race 46 in construction with the double offsets, the removal of the outer race spherical contact surfaces, and the judicious choice of the (PCD) and ball size permit a large improvement in efficiency while also improving durability. Predetermined ratios are contemplated with the constant velocity joint 30 as described above. A ratio C1 which is the ball diameter divided by the pitch circle diameter should be greater than or equal to 0.217 but less than or equal to 0.275 in an eight ball unit as shown here. However, in a or three plus three joint the C1 ratio could be greater than or equal to 0.217 and less than or equal to 0.318. It should be noted that if the C1 ratio is too large there will be a reduction in the cage 40 and inner race 46 strength and a loss of efficiency due to increased ball 44 sliding during the constant velocity joint 30 movement. However, if the ratio C1 is too small problems associated with assembling the inner race 46 into the cage 40 will occur. Furthermore, there will also be durability problems due to a lack of track edge support and reduced ball diameter. The lower ratio promotes ball rolling and thus increases efficiency of the constant velocity joint 30.

A ratio X1 is defined as the axial offset divided by the pitch circle diameter and should be within the range of greater than or equal to 0.06753 while being less than or equal to 0.135. If the X1 ratio is too big the constant velocity joint 30 will lose efficiency due to higher ball and cage forces. The larger variation of the ball path may also force an increase in the outside diameter of the outer race 32 to maintain adequate strength of the constant velocity joint 30. The larger ratio may also reduce track edge support at larger articulation angles as found in many current SUV vehicles. However, if the X1 ratio is too small there will be inadequate steering forces thus inhibiting the correct operation of the constant velocity joint 30. Additionally, a small X1 ratio tends to flatten the track and promotes better rolling behavior thus improving the efficiency of the constant velocity joint 30.

Yet another ratio Y1 which is defined as the radial offset divided by the pit circle diameter should be greater than or equal to 0.188. If this Y1 ratio is too small a larger variation of the ball path may force an increase in the outside diameter of the outer race 32 to maintain adequate strength of the constant velocity joint 30. A small Y1 ratio may also reduce track edge support at larger articulation angles thus reducing the durability of the constant velocity joint 30. A larger Y1 ratio flattens the track and improves efficiency by promoting better rolling behavior of the balls 44.

Therefore, the present invention of a high angle, high speed constant velocity joint 30 uses a combination of innovations to create a smaller, more reliable and more efficient joint. The constant velocity joint 30 has smaller part package given set capacity, while also reducing the weight of the constant velocity joint 30. The constant velocity joint 30 is designed to be at least twice as efficient as the standard high angle joint and will be more reliable thus increasing satisfaction of automotive manufacturers while reducing the number of joint failures and warranty issues thereafter. It should also be noted that various parameters such as the radial offset, the axial offset and the pit circle diameter may be adjusted to achieve specifically tuned objectives for the constant velocity joint 30 such as but not limited to the amount of articulation angle needed or required for the constant velocity joint 30 in the drive train system. The use of the smaller diameter and reduced width outer race 32 will also reduce the cost and complexity of assembling the constant velocity joint 30 for the automotive manufacturers thus reducing overall costs of the automotive vehicle. Hence, the high angle, i.e., greater than or equal to nine degree, high speed fixed constant velocity joint 30, has a better efficiency and more reliability than prior art high speed constant velocity joints that run at high temperatures thus causing premature boot and grease failures. The problem of the temperature based boot failures increases at the higher angles hence the current design limitations of the prior art constant velocity joint, need to be corrected to increase joint reliability and satisfaction. The higher temperatures and speed will produce higher stresses on the boot and contribute to many early failures of the constant velocity joint. Therefore, the present invention of the high speed, high angle constant velocity joint 30 overcomes these problems by the elimination of the spherical cage support surface on the outer race 32 in combination with a plurality of axially opposed tracks 38, 52 each of the tracks 38, 52 having a double offset therein. This will allow for high angles and while also promoting better efficiency and durability of the constant velocity joint 30 via better ball rolling within the joint environment.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A high angle constant velocity joint for use in a vehicle, said joint including:
    an outer race, said outer race having a bore therethrough, a plurality of tracks on an inside surface of said outer race, one half of said tracks open in a direction opposite to another one half of said tracks;
    a cage arranged within said bore of said outer race without contacting said outer race;
    an inner race arranged within said cage, said inner race having a plurality of tracks on an outer surface, one half of said tracks open in a direction opposite to another one half of said tracks on said inner race;
    said tracks having a double offset to flatten said tracks and promote more efficient rolling of said balls, said double offset includes a radial offset, and an axial offset, said axial offset and a pitch circle diameter having a ratio greater than $6.752 \times 10^{-2}$ and less than 0.136;
    a plurality of balls arranged within said cage and said tracks of said inner and outer race;
    a shaft connected to said inner race;
    a pliable boot arranged between said outer race and said shaft; and
    a cap contacting said outer race.

2. The joint of claim 1 having an N+N configuration where said N is equal to or less than 5.

3. The joint of claim 1 wherein said boot is arranged within said cage.

4. The joint of claim 1 wherein said outer race having a reduced thickness.

5. The joint of claim 1 wherein said ball diameter and a pitch circle diameter having a ratio greater than 0.216 and less than 0.319.

6. A high angle constant velocity joint for use in a vehicle, said joint including:
    an outer race, said outer race having a bore therethrough, a plurality of tracks on an inside surface of said outer race, one half of said tracks open in a direction opposite to another one half of said tracks;
    a cage arranged within said bore of said outer race without contacting said outer race;
    an inner race arranged within said cage, said inner race having a plurality of tracks on an outer surface, one half of said tracks open in a direction opposite to another one half of said tracks on said inner race;
    a plurality of balls arranged within said cage and said tracks of said inner and outer race;
    said tracks having a double offset to promote more efficient rolling of said balls, said double offset includes a radial offset and axial offset, said radial offset and a pitch circle diameter having a ratio greater than 0.187
    a shaft connected to said inner race;
    a pliable boot arranged between said outer race and said shaft; and
    a cap contacting said outer race.

7. A high angle eight ball constant velocity joint for use in a vehicle, said joint including:
    a reduced width outer race having a bore therein, a plurality of axially opposed tracks on an inside surface thereof, said tracks having an axial offset and radial offset;
    a cage arranged within said bore without contacting said outer race, said cage having a plurality of orifices arranged equidistantly around a circumference thereof;
    an inner race arranged within said cage without cage grooves, said inner race centers and supports said cage, said inner race having a plurality of axially opposed tracks on an outside surface thereof, said tracks having an axial offset and a radial offset;
    a plurality balls arranged within said orifices of said cage, said balls in contact with said tracks of said outer race and said inner race;
    a shaft connected to said inner race on one end thereof, said shaft having a diameter less than a diameter of said bore of said outer race;
    a boot cover contacting said outer race on one end;
    a pliable boot arranged between said boot cover and said shaft, a portion of said boot is located within said cage, said boot is a predetermined distance from a centerline of the joint; and
    a cap secured to said outer race on a side opposite of said boot cover.

* * * * *